United States Patent Office 3,488,425
Patented Jan. 6, 1970

3,488,425
PROCESS FOR COMBATTING INSECTS WITH BIS - (HEPTAFLUOROISOPROPOXYMETHYL) BENZENE SULFONATES
Everett E. Gilbert and Benjamin Veldhuis, Morristown, N.J., assignors to Allied Chemical Corporation, New York, N.Y., a corporation of New York
No Drawing. Continuation-in-part of application Ser. No. 536,984, Mar. 24, 1966. This application Mar. 23, 1967, Ser. No. 625,282
Int. Cl. A01n 9/12, 9/24
U.S. Cl. 424—315
6 Claims

ABSTRACT OF THE DISCLOSURE

This invention relates to a process for combatting insects with bis(heptafluoroisopropoxymethyl)-benzene sulfonates of the formula

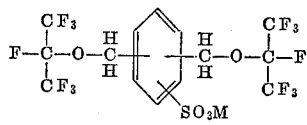

wherein M represents hydrogen or an alkali metal, such as potassium or sodium. The heptafluoroisopropoxymethyl groups can be in the 1,2-, 1,3- or 1,4-positions with respect to each other and the $SO_3M$ group is primarily in the 4-position in the 1,2-compound, primarily in the 4-position in the 1,3-compound and in the 2-position in the 1,4-compound.

---

The application is a continuation-in-part of our copending application Ser. No. 536,984, filed Mar. 24, 1966.

Preparations of the three bis(heptafluoroisopropoxymethyl)-benzene sulfonates and their alkali metal salts are described in our copending application above referred to, and are claimed therein as new compounds. Essentially the preparations involve reacting a haloketone-metal fluoride adduct with an alkyl aryl compound, followed by sulfonation of the aromatic ring by reaction with a sulfonating agent such as sulfur trioxide in the presence of a halogenated solvent medium such as fluorotrichloromethane. The reaction is preferably carried out by dissolving the $SO_3$ in the solvent and adding the solution dropwise to the reaction product of the alkyl aryl compound with the haloketone-metal fluoride adduct, with agitation over a 10–15 minute period at temperatures of about 5–15° C.

An example of preparation of one of our alkali metal sulfonates is given below:

(A) 1,4 - bis(bromomethyl)benzene and hexafluoroacetone-potassium fluoride adduct in acetonitrile were mixed in a pressure bottle and stirred for 2 days at room temperature, followed by heating at 90° C. for 4 hours, thus producing 1,4 - bis(heptafluoroisopropoxymethyl) benzene (B.P. 66–66.5° C. at 5 mm. Hg pressure).

(B) 1,4-bis(heptafluoroisopropoxymethyl)benzene produced in "A" and fluorotrichloromethane were mixed in a reaction flask. Stabilized sulfur trioxide in fluorotrichloromethane was added dropwise with stirring to the 1,4 - bis(heptafluoroisopropoxymethyl)benzene solution. The mixture was stirred at room temperature, poured into water and neutralized to pH 8 with 10% KOH. The solution was evaporated to dryness, yielding 1,4-bis(heptafluoroisopropoxymethyl)benzene sulfonate potassium salt. A 0.1% aqueous solution of the potassium salt showed a surface tension of 30 dynes.

We have now found that the three bis(heptafluoroisopropoxymethyl)-benzene sulfonates above-defined are effective toxicants in combatting certain noxious insects including pea aphids, *Macrosiphum pisi*, and two-spotted spider mites, *Tetranychus telarius*.

The fact that our compounds have insecticidal activity is surprising, since the corresponding unsulfonated compounds are not insecticidally active and it has heretofore been considered that sulfonation would act to detoxify biologically active compounds rather than conferring activity on otherwise inactive compounds.

In combatting noxious insects with the compounds of our invention, control of such pests can be effected by contacting the pests or their environment, their food or the host, such as insect infested plants, soils, etc., with the bis(heptafluoroisopropoxymethyl)-benzene sulfonates and their salts. Insects which can be controlled by the process of my invention can be in either adult, nymph, larval or egg form.

When reference is made herein to contacting pests with the compound of the invention, it is to be understood to include not only direct contacting, but also such contact achieved through treatment of the environment, habitat, food or host of such pests.

Application of the toxicant can be made in conventional manner, in admixture with a carrier. Usually the toxic compounds are mixed with at least one diluent, either solid or liquid, and are applied to the pest or its host, for example, as a finely divided dust, coarse granules or pellets, solvent solutions or aqueous sprays. The sulfonic acids and salts of my invention, which are both only slightly soluble in water can be used in the form of dilute solutions, or preferably can be prepared in the form of aqueous dispersions by dissolving the acid or salt in a solvent such as xylene and dispersing the solution in water with the aid of anionic, cationic, or non-ionic wetting, dispersing, or emulsifying agents. Concentrations of toxicant will depend on the sensitivity of the pest organisms to be controlled. Usually concentrations between about .03% and about 3.0% are sufficient.

Dusts, granules, pellets and wettable powders can also be used in applying the sulfonic acid compounds or their salts according to our invention. For the preparation of dusts the sulfonic acid of the appropriate salt thereof, may be mixed in finely divided solid form with suitable powders including finely divided dry solid talc, clays such as attapulgite, kaolin, or fuller's earth, wood flour, or other inert solid carriers of the type commonly employed in formulating pesticidal powder compositions. These powders may be granulated or pelleted; or solutions of the sulfonates may be impregnated into granular or pelleted carriers of mineral and vegetable origin. Wettable powder formulations, suitable for dispersing in water and applying the water dispersion to the soil, plants or insects, etc., are prepared by incorporating in any of the finely divided powders, small amounts of surface active materials, for example, about 1% to about 5% by weight, which serve to maintain the finely powdered composition dispersed in water with which it is mixed.

Suitable surface active materials adapted for use in making both liquid and solid dispersions are anionic, cationic, or non-ionic wetting, dispersing and emulsifying agents commonly employed in the formulation of wettable powder compositions, for example, as listed by J. W. McCutcheon in "Soap and Chemical Specialties," December 1957 and January, February, March and April 1958. These include the alkali metal and ammonium salts of long chain aliphatic carboxylic acids, sulfonates of the aromatic or long chain aliphatic hydrocarbons, such as sodium alkyl sulfates and sulfonates, alkyl aryl sulfonate salts, sulfonates of glycerides and their fatty acids and sulfonates of derivatives of fatty acid esters.

The following specific example further illustrates the invention. Parts are by weight except as otherwise noted.

EXAMPLE

Potassium salts of the three bis(heptafluoroisopropoxymethyl)-benzene sulfonic acids were tested as insecticides against pea aphids (*Macrosiphum pisi*) and two-spotted spider mites (*Tetranychus telarius*) as follows:

A mixture was prepared of equal parts by volume of acetone and water in separate portions of which were dissolved amounts of the 1,2-; 1,3-; and 1,4-bis(heptafluoroisopropoxymethyl)-benzene sulfonic acid potassium salts equivalent to 2 pounds of salt per 100 gallons of solution.

(a) Pea aphids

Then English broad bean plants were sprayed with this solution for 2 seconds on the upper surface and 5 seconds on the under surface.

Then 10 adult female pea aphids were brushed from infested broad bean plants into 5 inch screen wire hemipheres and sprayed for 5 seconds at a rate of approximately 0.6 ml. delivery of solution per second from the nozzle at 20 p.s.i. pressure, with the aphids 15 inches from the nozzle. Following treatment with the toxicant solution, the aphids were caged over broad bean plants which had been sprayed with toxicant as described above.

(b) Two-spotted spider mites

Young cranberry bean plants in 2½ inch pots were infested with mites in all stages, one day before treatment with the toxicants. The infested plants were sprayed on their upper and under surfaces as described in (a) above. Following spray treatment, the potted plants were placed in irrigated trays in a greenhouse and initial kills of adults recorded three days thereafter.

Results of the above tests are shown in the table below.

TABLE

| | Percent Kill On | |
|---|---|---|
| | Pea Aphids Adults | Two-Spotted Spider Mites |
| Compound, K-Salt: | | |
| A (1,2-bis) | 100 | 67 |
| B (1,3-bis) | 100 | 73 |
| C (1,4-bis) | 100 | 22 |

A=1,2-bis(heptafluoroisopropoxymethyl)-benzene sulfonate potassium salt.
B=1,3-bis(heptafluoroisopropoxymethyl)-benzene sulfonate potassium salt.
C=1,4-bis(heptafluoroisopropoxymethyl)-benzene sulfonate potassium salt.

We claim:
1. A method for controlling insect pests which comprises contacting said pests with an insecticidally effective amount of a compound of the formula

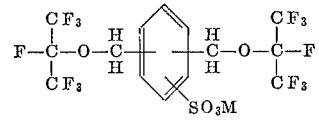

wherein M represents a member selected from the group consisting of hydrogen, sodium and potassium and wherein the heptafluoroisopropoxymethyl groups can be in the 1,2-positions, the 1,3-positions or the 1,4-positions, and the $SO_3M$ groups are respectively in the 4-position, the 4-position and the 2-position.

2. The process of claim 1 wherein the heptafluoroisopropoxymethyl groups are in the 1,2-positions with respect to each other, and the $SO_3M$ group is in the 4-position.

3. The process of claim 1 wherein the heptafluoroisopropoxymethyl groups are in the 1,3-positions with respect to each other, and the $SO_3M$ group is in the 4-position.

4. The process of claim 1 wherein the heptafluoroisopropoxymethyl groups are in the 1,4-positions with respect to each other, and the $SO_3M$ group is in the 2-position.

5. The process of claim 1 wherein M is potassium.
6. The process of claim 1 wherein M is sodium.

References Cited

UNITED STATES PATENTS 3,271,441  9/1966  Gilbert et al. _____ 260—512

ALBERT T. MEYERS, Primary Examiner

VINCENT O. TURNER, Assistant Examiner